J. W. MENHALL AND C. G. CLEMENT.
FIFTH WHEEL FOR VEHICLES.
APPLICATION FILED AUG. 26, 1918.
1,325,697.
Patented Dec. 23, 1919.
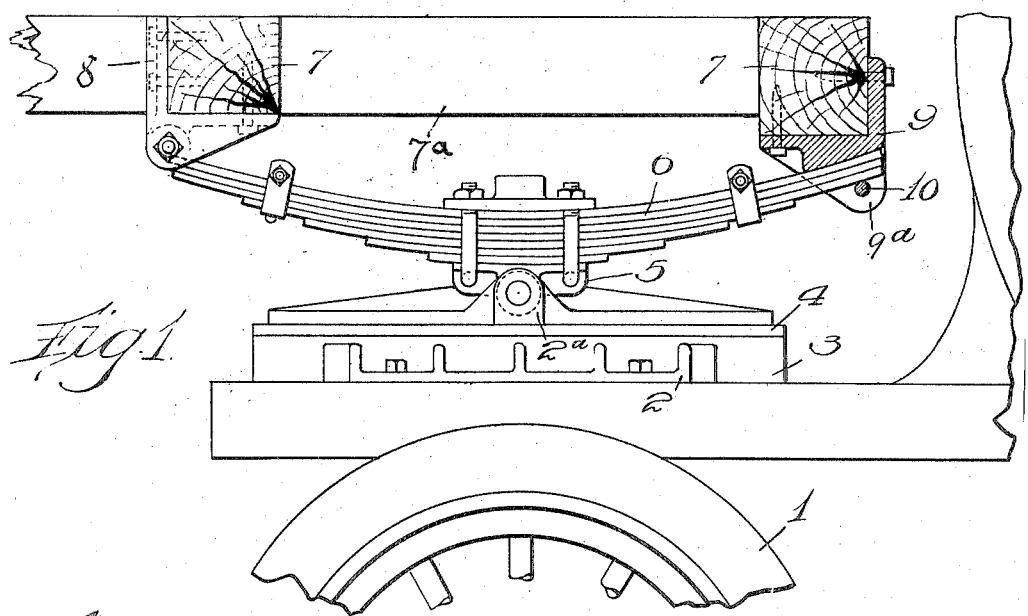
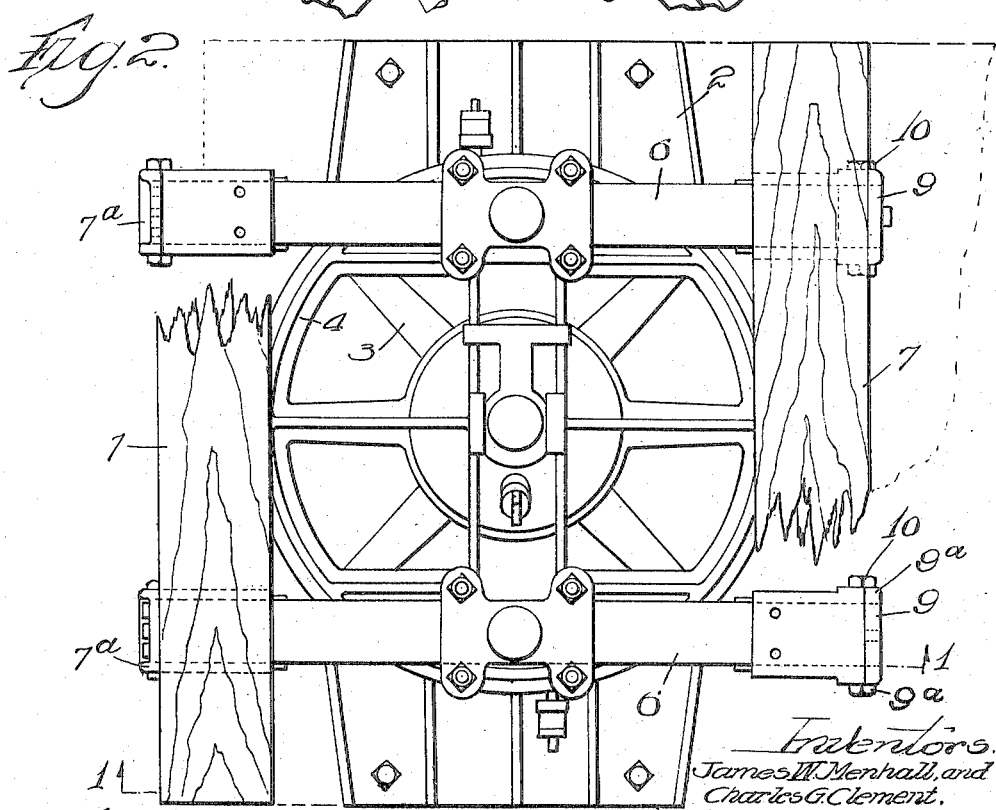
Inventors:
James W. Menhall, and
Charles G. Clement.
Witness:
by Burton & Burton
their Attys.

UNITED STATES PATENT OFFICE.

JAMES W. MENHALL AND CHARLES G. CLEMENT, OF EDGERTON, WISCONSIN, ASSIGNORS TO HIGHWAY TRAILER COMPANY, OF EDGERTON, WISCONSIN, A CORPORATION OF WISCONSIN.

FIFTH-WHEEL FOR VEHICLES.

1,325,697.          Specification of Letters Patent.      Patented Dec. 23, 1919.

Application filed August 26, 1918. Serial No. 251,388.

*To all whom it may concern:*

Be it known that we, JAMES W. MENHALL and CHARLES G. CLEMENT, residing at Edgerton, in the county of Rock and the State of Wisconsin, have invented certain new and useful Improvements in Fifth-Wheels for Vehicles, of which the following is a specification, reference being had to the accompanying drawings, forming a part thereof.

The purpose of this invention is to provide an improved construction of a fifth wheel for vehicles, particularly designed for use in trailer vehicles, to afford load-carrying springs between the load-carrying frame and the fifth wheel which shall not only cushion the load in respect to vertical shocks, but also in respect to the longitudinal shocks arising upon sudden stopping, with some capacity for easing the sudden starting of the load.

It consists in the elements and features of construction shown and described as indicated in the claims.

In the drawings:

Figure 1 is a partly sectional side elevation of one end portion of a trailer vehicle embodying this invention, section being made longitudinally of the vehicle through the transverse sills of the load-carrying frame, as at the line, 1—1, on Fig. 2.

Fig. 2 is a plan view of the same with the longitudinal sills partly broken away.

In the drawings, 1 represents one of the rear wheels of a tractor or of the forward wheels of a trailer of which 2 is a main transverse frame upon which is mounted the lower member, 3, of the fifth wheel. 4 is the upper member of the fifth wheel which is provided at opposite sides with two pairs of up-standing lugs, 2ª, to each pair of which there is pivoted a rocker, 5, upon the upper side of which there is seated, and to which there is firmly secured at the middle point of its length, a leaf spring, 6. The leaf springs are pivotally connected at one end (as shown, at the rear end) to the under side of the load-carrying frame, represented by the transverse sills, 7, 7, and longitudinal bar, 7ª, and at the forward end are provided with slide bearings on the under side of said load-carrying frame. The pivotal connection mentioned is afforded by means of angle brackets, 8, secured to the cross-sill, 7, and the slide bearing at the forward end is similarly provided by angle brackets, 9, secured to the forward cross-sill, 7. For obtaining in the most complete manner the desired effect, the slide bearing mentioned is inclined longitudinally of the vehicle, sloping up away from the mounting point of the leaf spring, that is, up forward, as shown in the drawings; and a cross pin, 10, is extended across the gap between the side lugs, 9ª, 9ª, of this bracket, 9, below the spring to retain it in place slidingly between the lugs and against the slide bearing. It is not of vital importance which end of the leaf springs, (forward or rear end) has the pivotal connection and which has the slide bearing.

In operation it will be observed that the side spring, beside cushioning the load for up-and-down shocks, will operate to cushion it as to longitudinal shocks such as result from sudden stopping, and to ease the starting action to some extent, as in certain familiar forms of traction springs; for it will be seen that longitudinal thrust or pull upon the load-carrying frame, operating forwardly, will tend to pull up the rear pivotally-connected end of the spring against the yielding resistance of the springs, and at the same time the slide bearing of the load upon the forward end of the spring being inclined upward, such longitudinal thrust or pull is yieldingly resisted as it tends to spring downward the forward end of the springs and such downward movement is yieldingly resisted in that tendency by the springs. Similarly, upon rearward thrust or pull there is caused a downward movement of the rear pivoted end of the spring, which is yieldingly resisted by the rear half of the spring, while at the forward end the cross-pin, 10, engaging under the spring, encounters the yielding resistance of the spring against the upward bending of its forward end; so that both end portions of the spring offer yielding resistance to the end thrust or pull in either direction.

We claim:—

1. In combination with a load-carrying frame, a fifth wheel below the same; rockers pivotally mounted for movement in vertical fore-and-aft planes on the upper member of the fifth wheel at opposite sides of its vertical axis; fore-and-aft leaf springs secured rigidly at the middle to the rockers respectively, each having at one end pivotal connection to the load-carrying frame, and at the opposite end longitudinal slide bearing thereunder.

2. In the construction such as set out in claim 1 foregoing, the longitudinal slide bearing mentioned being inclined longitudinally of the vehicle sloping away from the mounting point of the spring on the rocker.

In testimony whereof, we have hereunto set our hands at Edgerton, Wisconsin, this 23rd day of August, 1918.

JAMES W. MENHALL.
CHARLES G. CLEMENT.